(12) United States Patent
Zhao et al.

(10) Patent No.: US 12,590,570 B2
(45) Date of Patent: Mar. 31, 2026

(54) BLADE FAULT DIAGNOSIS METHOD, APPARATUS AND SYSTEM, AND STORAGE MEDIUM

(71) Applicant: BEIJING GOLDWIND SCIENCE & CREATION WINDPOWER EQUIPMENT CO., LTD., Beijing (CN)

(72) Inventors: Yong Zhao, Beijing (CN); Xinle Li, Beijing (CN); Xinyuan Niu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 406 days.

(21) Appl. No.: 18/260,075

(22) PCT Filed: Jun. 30, 2021

(86) PCT No.: PCT/CN2021/103439
§ 371 (c)(1),
(2) Date: Jun. 30, 2023

(87) PCT Pub. No.: WO2022/142213
PCT Pub. Date: Jul. 7, 2022

(65) Prior Publication Data
US 2024/0052810 A1      Feb. 15, 2024

(30) Foreign Application Priority Data
Dec. 30, 2020    (CN) .......................... 202011622722.2

(51) Int. Cl.
| | |
|---|---|
| *F03D 17/00* | (2016.01) |
| *G01M 99/00* | (2011.01) |
| *G06F 18/10* | (2023.01) |

(52) U.S. Cl.
CPC ......... *F03D 17/024* (2023.08); *F03D 17/028* (2023.08); *G01M 99/005* (2013.01); *G06F 18/10* (2023.01); *F05B 2260/80* (2013.01)

(58) Field of Classification Search
CPC ............. G01M 5/0016; G01M 5/0066; G01M 99/005; F03D 17/005; F03D 17/024;
(Continued)

(56) References Cited

U.S. PATENT DOCUMENTS

| | | | |
|---|---|---|---|
| 5,448,645 A | 9/1995 | Guerci | |
| 10,344,740 B2 * | 7/2019 | Caponetti | ............... F03D 7/042 |

FOREIGN PATENT DOCUMENTS

| | | |
|---|---|---|
| CN | 104101652 A | 10/2014 |
| CN | 105508149 A | 4/2016 |
(Continued)

OTHER PUBLICATIONS

Han et al., CN 112067701 A, "Fan Blade Remote Auscultation Method Based On Acoustic Diagnosis", Date Published: Dec. 11, 2020 (Year: 2020).*
(Continued)

*Primary Examiner* — John H Le
(74) *Attorney, Agent, or Firm* — Frank Gao, Esq.

(57) ABSTRACT

The present application discloses a blade fault diagnosis method, apparatus and system, and a storage medium, the method includes: acquiring a blade rotation audio collected by an audio collection device during operation of a wind turbine generator system; preprocessing the blade rotation audio based on a wind noise filtering algorithm to obtain a blade rotation audio filtered out of wind noise; dividing the blade rotation audio filtered out of wind noise to obtain audio segments corresponding to blades of the wind turbine generator system respectively; diagnosing, based on the audio segments, whether the blades each corresponding to
(Continued)

one of the audio segments are faulty. The present application can diagnose whether a corresponding blade is faulty respectively according to the audio segments of different blades, which improves the accuracy of the diagnosis results.

8 Claims, 9 Drawing Sheets

(58) Field of Classification Search
CPC ......... F03D 17/028; G01H 3/08; G06F 18/10; G06F 18/24147; Y02E 10/72; F05B 2260/80; F05B 2260/84
USPC .......................................................... 702/39
See application file for complete search history.

(56) References Cited

FOREIGN PATENT DOCUMENTS

| | | | |
|---|---|---|---|
| CN | 110792563 | A | 2/2020 |
| CN | 110838302 | A | 2/2020 |
| CN | 110853636 | A | 2/2020 |
| CN | 111161756 | A | 5/2020 |
| CN | 111306008 | A | 6/2020 |
| CN | 111306010 | A | 6/2020 |
| CN | 112067701 | A | 12/2020 |
| KR | 20200060179 | A | 5/2020 |

OTHER PUBLICATIONS

CN 112067701 A, Date published: Dec. 11, 2020, English translation (Year: 2020).*

Zhou et al.,, CN 104101652 A, "A Audio Signal Based On Air Power Blade Damage Monitoring Method And Monitoring System", Date Publish: Oct. 15, 2015 (Year: 2015).*

The Extended European Search Report dated Apr. 26, 2024; Appln. No. 21912969.9.

Concise Explanation of Relevance for CN—OA1; Appln. No. 202011622722.2; dated Dec. 26, 2024.

The International Search Report and Written Opinion mailed Aug. 31, 2021; PCT/CN2021/103439.

* cited by examiner

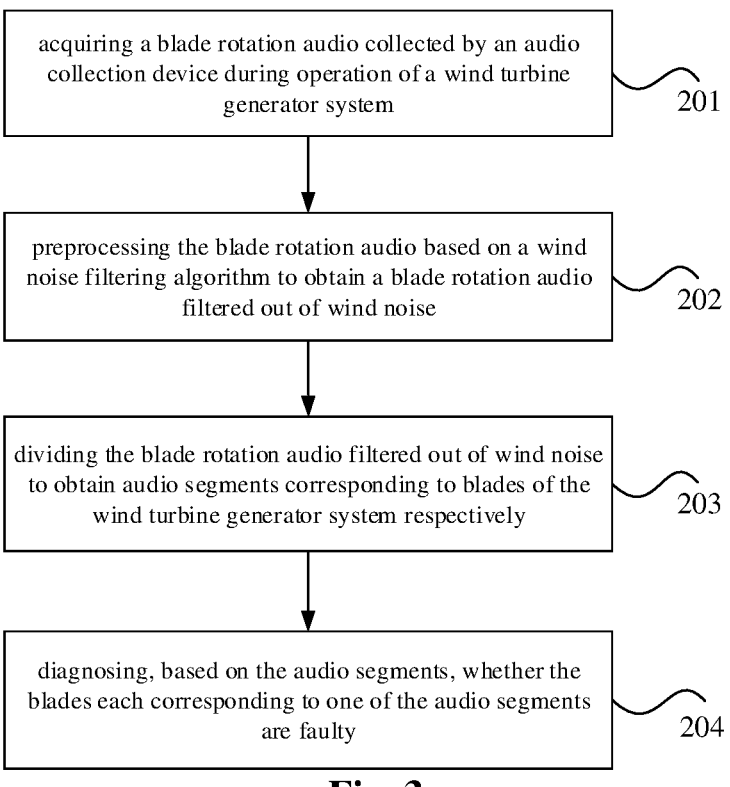

acquiring a blade rotation audio collected by an audio collection device during operation of a wind turbine generator system — 201 preprocessing the blade rotation audio based on a wind noise filtering algorithm to obtain a blade rotation audio filtered out of wind noise — 202 dividing the blade rotation audio filtered out of wind noise to obtain audio segments corresponding to blades of the wind turbine generator system respectively — 203 diagnosing, based on the audio segments, whether the blades each corresponding to one of the audio segments are faulty — 204

Fig. 3

BLADE FAULT DIAGNOSIS METHOD, APPARATUS AND SYSTEM, AND STORAGE MEDIUM

CROSS-REFERENCE TO RELATED APPLICATION

The present application is a National Stage of International Application No. PCT/CN2021/103439 filed on Jun. 30, 2021, which claims priority to Chinese Patent Application No. 202011622722.2, filed on Dec. 30, 2020 and entitled "BLADE FAULT DIAGNOSIS METHOD, APPARATUS AND SYSTEM, AND STORAGE MEDIUM", both of which are hereby incorporated by reference in their entireties.

TECHNICAL FIELD

The present application generally relates to a technical field of wind power generation, and more particularly to a blade fault diagnosis method, apparatus and system, and a storage medium.

BACKGROUND

The blades of the wind turbine generator system will make sounds when rotating. Under a condition that a blade is damaged or defected, the blade rotation audio will change. Therefore, when monitoring the status of the blades of the wind turbine generator system, an implementation is that collecting the blade rotation audio, and then judging, based on the audio signal, whether the blades of the wind turbine generator system are faulty.

However, the inventor found that the change of the audio signal is small when the blade is faulty, and the audio signals of different blades have subtle differences, which may lead to the misdiagnosis of the existing method for diagnosing whether the blade is faulty through the audio.

SUMMARY

The embodiments of the present application provide a blade fault diagnosis method, apparatus and system, and a storage medium.

In an aspect, an embodiment of the present application provides a blade fault diagnosis method, including: acquiring a blade rotation audio collected by an audio collection device during operation of a wind turbine generator system; preprocessing the blade rotation audio based on a wind noise filtering algorithm to obtain a blade rotation audio filtered out of wind noise; dividing the blade rotation audio filtered out of wind noise to obtain audio segments corresponding to blades of the wind turbine generator system respectively; diagnosing, based on the audio segments, whether the blades each corresponding to one of the audio segments are faulty.

Exemplary, dividing the blade rotation audio filtered out of wind noise to obtain the audio segments corresponding to the blades respectively includes: processing, by a short-time Fourier transform, the blade rotation audio filtered out of wind noise to obtain a first feature value, wherein the first feature value is configured to characterize a frequency domain feature of the blade rotation audio filtered out of wind noise; inputting the first feature value to a blade recognition model to obtain dividing time points of the blade rotation audio filtered out of wind noise, wherein the blade recognition model is a pre-trained model configured to identify switching time points of rotation sounds of different blades according to the first feature value; dividing the blade rotation audio filtered out of wind noise according to the dividing time points to obtain the audio segments corresponding to the blades respectively.

Exemplary, diagnosing, based on the audio segments, whether the blades each corresponding to one of the audio segments are faulty includes: processing each of the audio segments by a Fourier transform to obtain a second feature value of each of the audio segments, wherein the second feature value is configured to characterize a frequency domain feature of each of the audio segments; inputting the second feature value of each of the audio segments to a blade fault diagnosis model to obtain a first fault diagnosis result of each of the blades, wherein the blade fault diagnosis model is a pre-trained model configured to identify whether a blade corresponding to the audio segment is faulty according to the second feature value of the audio segment.

Exemplary, diagnosing, based on the audio segments, whether the blades each corresponding to one of the audio segments are faulty includes: counting durations of the audio segments corresponding to the blades respectively; obtaining a second fault diagnosis result by judging whether there is a faulty blade according to whether a difference between durations of every two audio segments exceeds a preset threshold value; judging, by combining the first fault diagnosis result of each of the blades and the second fault diagnosis result, whether there is a faulty blade.

Exemplary, before diagnosing, based on the audio segments, whether the blades each corresponding to one of the audio segments are faulty, the method further includes: acquiring an environmental parameter of the wind turbine generator system, wherein the environmental parameter is configured to indicate a season and/or weather; determining, among a plurality of candidate fault diagnosis models configured to identify different fault types respectively, a model configured to identify a fault type corresponding to the environmental parameter, so as to determine a fault diagnosis model for use.

Exemplary, acquiring the blade rotation audio collected by the audio collection device during the operation of the wind turbine generator system includes acquiring blade rotation audios collected at a plurality of locations; preprocessing the blade rotation audio based on the wind noise filtering algorithm to obtain the blade rotation audio filtered out of wind noise includes processing each of the blade rotation audios respectively based on the wind noise filtering algorithm to obtain a plurality of blade rotation audios filtered out of wind noise; after the plurality of blade rotation audios filtered out of wind noise are obtained, the method further includes calculating a wind noise parameter of each of the plurality of blade rotation audios filtered out of wind noise respectively by a wind noise recognition model, wherein the wind noise parameter is configured to represent a wind noise level in the audio, and the wind noise recognition model is a pre-trained model configured to evaluate the wind noise parameter of the audio; dividing the blade rotation audio filtered out of wind noise to obtain the audio segments corresponding to the blades respectively includes selecting, according to the wind noise parameter and among the plurality of blade rotation audios filtered out of wind noise, a blade rotation audio filtered out of wind noise with a minimum wind noise, and dividing the blade rotation audio filtered out of wind noise with the minimum wind noise to obtain the audio segments corresponding to the blades respectively.

Exemplary, calculating the wind noise parameter of each of the plurality of blade rotation audios filtered out of wind noise respectively by the wind noise recognition model includes: processing each of the plurality of blade rotation audios filtered out of wind noise by a Fourier transform to obtain a third feature value of each of the plurality of blade rotation audios filtered out of wind noise, and the third feature value is configured to characterize a frequency domain feature of a corresponding blade rotation audio filtered out of wind noise; inputting the third feature value of each of the plurality of blade rotation audios filtered out of wind noise to the wind noise recognition model to obtain the wind noise parameter of each of the plurality of blade rotation audios filtered out of wind noise.

In another aspect, an embodiment of the present application provides a blade fault diagnosis apparatus, including: an acquisition module configured to acquire a blade rotation audio collected by an audio collection device during an operation of a wind turbine generator system; a preprocessing module configured to preprocess the blade rotation audio based on a wind noise filtering algorithm to obtain a blade rotation audio filtered out of wind noise; a dividing module configured to divide the blade rotation audio filtered out of wind noise to obtain audio segments corresponding to blades of the wind turbine generator system respectively; a diagnosis module configured to diagnose, based on the audio segments, whether the blades each corresponding to one of the audio segments are faulty.

Exemplary, dividing the blade rotation audio filtered out of wind noise to obtain the audio segments corresponding to the blades respectively includes: processing, by a short-time Fourier transform, the blade rotation audio filtered out of wind noise to obtain a first feature value, wherein the first feature value is configured to characterize a frequency domain feature of the blade rotation audio filtered out of wind noise; inputting the first feature value to a blade recognition model to obtain dividing time points of the blade rotation audio filtered out of wind noise, wherein the blade recognition model is a pre-trained model configured to identify switching time points of rotation sounds of different blades according to the first feature value; dividing the blade rotation audio filtered out of wind noise according to the dividing time points to obtain the audio segments corresponding to the blades respectively.

Exemplary, diagnosing, based on the audio segments, whether the blades each corresponding to one of the audio segments are faulty includes: processing each of the audio segments by a Fourier transform to obtain a second feature value of each of the audio segments, wherein the second feature value is configured to characterize a frequency domain feature of each of the audio segments; inputting the second feature value of each of the audio segments to a blade fault diagnosis model to obtain a first fault diagnosis result of each of the blades, wherein the blade fault diagnosis model is a pre-trained model configured to identify whether a blade corresponding to the audio segment is faulty according to the second feature value of the audio segment.

Exemplary, diagnosing, based on the audio segments, whether the blades each corresponding to one of the audio segments are faulty includes: counting durations of the audio segments corresponding to the blades respectively; obtaining a second fault diagnosis result by judging whether there is a faulty blade according to whether a difference between durations of every two audio segments exceeds a preset threshold value; judging, by combining the first fault diagnosis result of each of the blades and the second fault diagnosis result, whether there is a faulty blade.

Exemplary, before diagnosing, based on the audio segments, whether the blades each corresponding to one of the audio segments are faulty, the method further includes: acquiring an environmental parameter of the wind turbine generator system, wherein the environmental parameter is configured to indicate a season and/or weather; determining, among a plurality of candidate fault diagnosis models configured to identify different fault types respectively, a model configured to identify a fault type corresponding to the environmental parameter, so as to determine a fault diagnosis model for use.

Exemplary, acquiring the blade rotation audio collected by the audio collection device during the operation of the wind turbine generator system includes acquiring blade rotation audios collected at a plurality of locations; preprocessing the blade rotation audio based on the wind noise filtering algorithm to obtain the blade rotation audio filtered out of wind noise includes processing each of the blade rotation audios respectively based on the wind noise filtering algorithm to obtain a plurality of blade rotation audios filtered out of wind noise; after the plurality of blade rotation audios filtered out of wind noise are obtained, the method further includes calculating a wind noise parameter of each of the plurality of blade rotation audios filtered out of wind noise respectively by a wind noise recognition model, wherein the wind noise parameter is configured to represent a wind noise level in the audio, and the wind noise recognition model is a pre-trained model configured to evaluate the wind noise parameter of the audio; dividing the blade rotation audio filtered out of wind noise to obtain the audio segments corresponding to the blades respectively includes selecting, according to the wind noise parameter and among the plurality of blade rotation audios filtered out of wind noise, a blade rotation audio filtered out of wind noise with a minimum wind noise, and dividing the blade rotation audio filtered out of wind noise with the minimum wind noise to obtain the audio segments corresponding to the blades respectively.

Exemplary, calculating the wind noise parameter of each of the plurality of blade rotation audios filtered out of wind noise respectively by the wind noise recognition model includes: processing each of the plurality of blade rotation audios filtered out of wind noise by a Fourier transform to obtain a third feature value of each of the plurality of blade rotation audios filtered out of wind noise, and the third feature value is configured to characterize a frequency domain feature of a corresponding blade rotation audio filtered out of wind noise; inputting the third feature value of each of the plurality of blade rotation audios filtered out of wind noise to the wind noise recognition model to obtain the wind noise parameter of each of the plurality of blade rotation audios filtered out of wind noise.

In another aspect, an embodiment of the present application provides a blade fault diagnosis system, including: an audio collection device including a plurality of audio sensors, wherein at least one of the audio sensors is disposed at a prevailing wind direction position or a lee wind direction position of a tower barrel of a wind turbine generator system; a processor disposed inside of the tower barrel and connected to the audio sensors, wherein the processor is configured to: receive a blade rotation audio collected by the audio sensors; preprocess the blade rotation audio based on a wind noise filtering algorithm to obtain a blade rotation audio filtered out of wind noise; divide the blade rotation audio filtered out of wind noise to obtain audio segments corresponding to blades of the wind turbine generator system respectively; diagnose, based on the audio segments, whether the blades each corresponding to one of the audio segments are faulty.

Exemplary, the system further includes a server connected to the processor, wherein the server is configured to acquire the results of the processor diagnosing whether the blades are faulty, and to prompt under a condition that the blades are faulty.

In another aspect, an embodiment of the present application provides a storage medium having computer program instructions stored thereon, wherein the computer program instructions, when executed by a processor, implement the blade fault diagnosis method of the embodiment of the present application.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive efforts.

FIG. 3 is a schematic flowchart of a blade fault diagnosis method provided by an embodiment of the present application;

DETAILED DESCRIPTION

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, but not to limit the present application. It will be apparent to a person skilled in the art that the present application may be practiced without some of these specific details. The following description of the embodiments is merely to provide a better understanding of the present application by illustrating examples of the present application.

It should be noted that, in this document, relational terms such as first and second are used only to distinguish one entity or operation from another entity or operation, and do not necessarily require or imply such an actual relationship or sequence between these entities or operations. Moreover, the terms "comprising", "including" or any other variation thereof are intended to encompass a non-exclusive inclusion such that a process, method, article or device that includes a list of elements includes not only those elements, but also includes other elements that are not explicitly listed but inherent to such a process, method, article or device. Without further limitation, an element defined by the term "comprising . . ." does not preclude presence of additional elements in a process, method, article or device that includes the element.

In order to solve the technical problems, the embodiments of the present application provide a blade fault diagnosis method, apparatus and system, and a storage medium.

The blade fault diagnosis system provided by the embodiments of the present application will be firstly introduced below.

Figure 1:
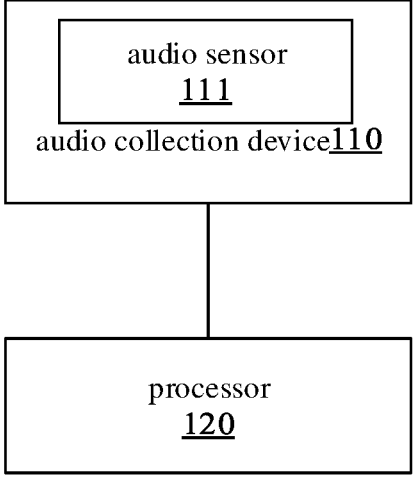
FIG. 1 is a schematic diagram of a blade fault diagnosis system provided by an embodiment of the present application.

As shown in FIG. 1, FIG. 1 is a schematic structural diagram of an example of a blade fault diagnosis system provided by an embodiment of the present application. The system includes an audio collection device 110 and a processor 120, wherein the audio collection device 110 includes at least one audio sensor 111.

At least one audio sensor 111 is disposed at a prevailing wind direction position or a lee wind direction position of a tower barrel of a wind turbine generator system. The audio sensor 111 is configured to collect the blade rotation audio signal of the wind turbine generator system. The blades of the wind turbine generator system will make sounds when rotating, and under a condition that a blade is faulty, the blade rotation sound will change. Therefore, the audio signal collected by the audio sensor 111 can be used to diagnose the blade fault. Exemplary, the audio sensor 111 may be a sound pickup. Exemplary, in addition to the audio sensor 111, the audio collection device 110 may include a signal processing module. Herein, the signal processing module of the audio collection device 110 may be configured to convert the blade rotation audio signal collected by the audio sensor 111 to the blade rotation audio, and exemplary, may be further configured to preprocess the blade rotation audio. The audio sensor 111 of the audio collection device 110 may be disposed on the outer wall of the tower barrel of the wind turbine generator system, and other hardware parts of the audio collection device 110 may be disposed inside of the tower barrel of the wind turbine generator system. The hardware inside of the tower barrel may communicate with the audio sensor 111 through wired communication or wireless communication. For example, the hardware of the audio collection device 110 inside the tower barrel may be connected to the audio sensor 111 through a fiber optic communication cable to receive the audio signals collected by the audio sensor 111.

Figure 2:
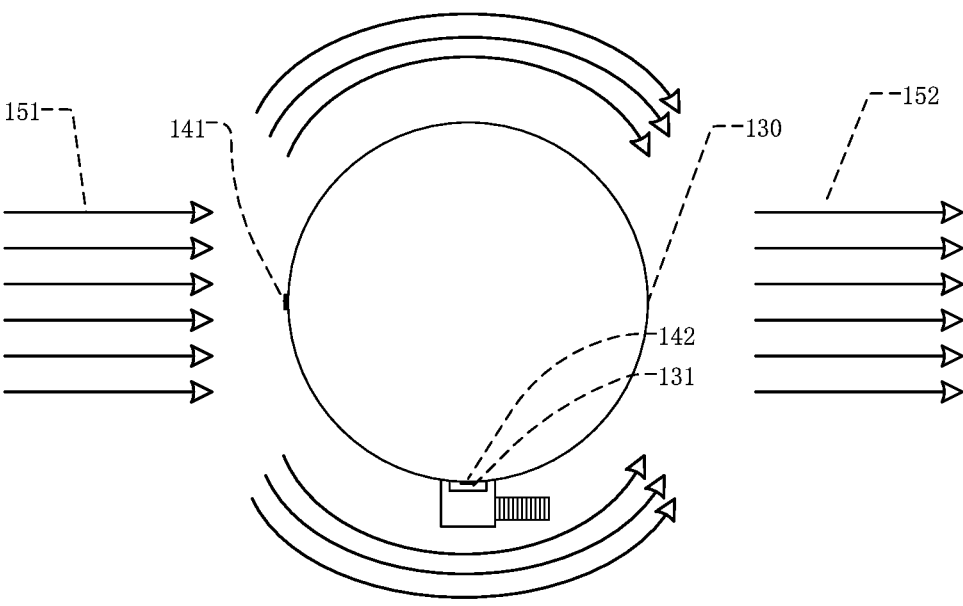
FIG. 2 is a schematic diagram of a blade fault diagnosis system provided by another embodiment of the present application.

As shown in FIG. 2, FIG. 2 is a schematic installation diagram of example audio sensors. The audio sensor 111 of FIG. 1 may include an audio sensor 141 and an audio sensor 142 of FIG. 2. The audio sensor 141 is disposed at the position of the prevailing wind direction 151 of the tower barrel 130 of the wind turbine generator system (FIG. 2 illustrates a cross section view of the tower barrel 130 of the wind turbine generator system 130). The audio sensor 142 is disposed above a tower barrel door 131 of the wind turbine generator system, that is, in a direction having an angle 90° from the prevailing wind direction 151 or the lee wind direction 152. Exemplary, the audio sensors may be disposed on the external tower wall at the bottom of the tower barrel of the wind turbine generator system in a fixed way such as magnetic suction.

The audio sensor is disposed at the prevailing wind direction position or the lee wind direction position, because the wind speed at the prevailing wind direction and the lee wind direction is small, and the wind noise is relatively small. Therefore, the interference of the wind noise to the collected blade rotation audio is small, and the fault diagnosis results are more accurate. Comparison is made with respect to the audio sensor disposed in the generator room of the wind turbine generator system, or the audio sensor disposed above the tower barrel door at the bottom of the tower barrel. Under a condition that the audio sensor is disposed near the generator room, the wind speed is large, and the influence of the wind noise to the collected audio is large, it is difficult to record a clear blade rotation audio. Under a condition that the audio sensor is disposed above the tower barrel door (in a direction having an angle 90° from the prevailing wind direction), because that the tower barrel door is the area with the fastest wind speed in the wind flow field, the influence of the wind noise to the collected audio is large. The wind speed at the prevailing wind direction or the lee wind direction in the wind flow field is small, and the influence of the wind noise to the collected audio is relatively small, so that the relatively clear blade rotation audio can be collected.

Under a condition that the audio collection device 110 includes two or more audio sensors 111, at least one audio sensor 111 is disposed at the prevailing wind direction position or the lee wind direction position on the tower barrel of the wind turbine generator system. The remaining audio sensors 111 may be disposed in other positions, for example, may be disposed at a position having an angle 90° from the prevailing wind direction. Alternatively, two or more audio sensors 111 may be distributed evenly around the perimeter of the tower barrel of the wind turbine generator system, and it is ensured that at least one audio sensor 111 is disposed at the prevailing wind direction position or the lee wind direction position. Exemplary, two or more audio sensors 111 may be disposed on the same cross section of the tower barrel or on different cross sections of the tower barrel.

The processor 120 may be disposed inside of the tower barrel of the wind turbine generator system and connected to the audio sensors 111. The processor 120 is configured to: receive a blade rotation audio collected by the audio sensors 111; preprocess the blade rotation audio based on a wind noise filtering algorithm to obtain a blade rotation audio filtered out of wind noise; divide the blade rotation audio filtered out of wind noise to obtain audio segments corresponding to blades of the wind turbine generator system respectively; diagnose, based on the audio segments, whether the blades each corresponding to one of the audio segments are faulty. The processor 120 may perform programs, so as to achieve diagnosing whether the blades are faulty based on the blade rotation audio.

Exemplary, the system further includes a server connected to the processor 120. The server is configured to acquire the results of the processor 120 diagnosing whether the blades are faulty, and to prompt under a condition that the blades are faulty. The server may be disposed in a central control room of the wind field, and may communicate with the processor 120 disposed in the tower barrel of the wind turbine generator system via a switch.

An embodiment of the present application further provides a blade fault diagnosis method, which can be performed by the processor in the blade fault diagnosis system provided by the embodiment of the present application. The part not detailed described in the steps performed by the processor in the blade fault diagnosis system provided by the embodiment of the present application can refer to the description of the blade fault diagnosis method provided by the embodiment of the present application.

The blade fault diagnosis method provided by the embodiment of the present application will be introduced below.

FIG. 3 is a schematic flowchart of a blade fault diagnosis method provided by an embodiment of the present application. As shown in FIG. 3, the method includes step 201 to step 204.

Step 201: acquiring a blade rotation audio collected by an audio collection device during operation of a wind turbine generator system.

The audio collection device can be configured to collect the blade rotation audio. During the operation of the wind turbine generator system, the blades will make sounds when rotating, and the blade rotation audio can be generated from the sound signal collected by the audio collection device.

The audio collection device may communicate with the executing party of the blade fault diagnosis method provided by the embodiment of the present application through wired communication (for example, through an optical fiber communication cable) or wireless communication, so as to transmit the blade rotation audio collected by the audio collection device to the executing party. For example, the executing party of the blade fault diagnosis method may be a server disposed in the central control room, or the executing party may also be the processor 120 of the blade fault diagnosis system of the embodiment shown in FIG. 1. The processor 120 may also be disposed inside of the tower barrel of the wind turbine generator system, and after performing the blade fault diagnosis method provided by the embodiment of the present application to obtain the blade fault diagnosis results, the processor 120 may transmit the blade fault diagnosis results to the server.

Exemplary, the collection duration may be a preset duration. For example, it is preconfigured that the blade rotation audio is collected for 1 minute every time.

Step 202: preprocessing the blade rotation audio based on a wind noise filtering algorithm to obtain a blade rotation audio filtered out of wind noise.

The wind noise filtering algorithm is configured to filter out the wind noise in the blade rotation audio. Because the audio collection device is in the wind field, the collected audio includes wind noise, that is, noise from wind. In order to obtain a clear blade rotation audio, the wind noise in the blade rotation audio can be eliminated through the wind noise filtering algorithm.

Optionally, the wind noise filtering algorithm may be a Kalman filtering algorithm, a median value filtering algorithm, an arithmetic average filtering algorithm, a sliding average filtering algorithm and the like, which is not limited in the embodiments of the present application.

Because the wind noise is a kind of white noise, the frequency of the wind noise can be counted according to the recording of historically collected audio, and the frequency filter of the audio may be designed, so as to reduce the components of the partial frequency band in the blade rotation audio.

In an exemplary embodiment, after the blade rotation audio is obtained, the blade rotation audio is converted to the frequency domain through the Fourier transform, and then a designed frequency filter (wind noise filtering algorithm) is used in the frequency domain. Therefore, the components of the frequency band where the wind noise is located may be reduced, and the blade rotation audio filtered out of wind noise may be obtained.

Step 203: dividing the blade rotation audio filtered out of wind noise to obtain audio segments corresponding to blades of the wind turbine generator system respectively.

Because the audio sensor of the audio collection device is fixed, in a rotation cycle of the blades of the wind turbine generator system, the rotation sound intensity (the unit can be decibels) of each of the blades may have a process from small to large and then to small. Therefore, this characteristic may be used to divide the blade rotation audio to obtain the audio segments corresponding to the blades respectively. In the audio segments corresponding to the blades respectively, the blade sound intensity is the main component of the audio intensity in the audio segments. By dividing the blade rotation audio, the accuracy of blade fault diagnosis can be improved.

Exemplary, the step 203 of dividing the blade rotation audio filtered out of wind noise to obtain audio segments corresponding to blades of the wind turbine generator system respectively may include the following step 2031 to step 2033.

Step 2031: processing, by a short-time Fourier transform, the blade rotation audio filtered out of wind noise to obtain a first feature value.

The first feature value is configured to characterize a frequency domain feature of the blade rotation audio filtered out of wind noise.

The short-time Fourier transform may use a fixed window function, and then move the window function to calculate the power spectrum at different times, that is, to obtain the first feature value.

Exemplary, the window length of the window function used by the short-time Fourier transform may be a preset value. For example, a Fourier transform is performed on the blade rotation audio in a window of 10$s$. The frequency domain feature of the audio within each window may be better obtained through the short-time Fourier transform, so that the results of identifying the dividing time points based on the results of the short-time Fourier transform may be more accurate.

Step 2032: inputting the first feature value to a blade recognition model to obtain dividing time points of the blade rotation audio filtered out of wind noise.

After obtaining the results (the first feature value) of the short-time Fourier transform of the blade rotation audio, the first feature value is input to the blade recognition model.

The blade recognition model is a pre-trained model configured to identify switching time points of rotation sounds of different blades according to the first feature value.

Exemplary, the blade recognition model may be a machine learning based algorithm model, such as a model based on support vector machine (SVM), or a k nearest neighbor algorithm, or a convolutional neural network (CNN) model, which is not limited by the embodiments of the present application.

Support vector machine is a supervised learning method. It is a generalized linear classifier (generalized linear classifier) that can perform binary classification of data. Its decision boundary is the maximum-margin hyperplane for solving the learning sample. Supervised learning is the process of using a set of known categories to adjust the parameters of the classifier to achieve the required performance. The hyperplane is a linear subspace with codimension equal to one in n-dimensional Euclidean space, that is, it must be a (n–1) dimension.

Step 2033: dividing the blade rotation audio filtered out of wind noise according to the dividing time points to obtain the audio segments corresponding to the blades respectively.

The output results of the blade recognition model may be the dividing time points, and the audio segments corresponding to the blades respectively can be captured from the blade rotation audio based on the dividing time points. Exemplary, the audio segments corresponding to the blades respectively in a rotation cycle can be captured, that is, the number of the audio segments is the same as the number of the blades in the wind turbine generator system.

For example, for the blade rotation audio, the dividing time points may be 1 s, 2.1 s, 3.08 s, and 4.13 s. The audio segments obtained by dividing the blade rotation audio may include an audio segment 1 within 1~2.1 s, an audio segment 2 within 2.1~3.08 s, and an audio segment 3 within 3.08~4.13 s. It should be noted that each audio segment cannot be distinguished from which actual blade it corresponds to, and the audio segments corresponding to different blades can be distinguished by different identifications. For example, the audio segment 1 corresponds to a blade 1, the audio segment 2 corresponds to a blade 2, and the audio segment 3 corresponds to a blade 3.

Step 204: diagnosing, based on the audio segments, whether the blades each corresponding to one of the audio segments are faulty.

Since each audio segment is the rotation sound of the corresponding blade, based on the characteristics of the audio segments in the time domain and/or the frequency domain, it may be diagnosed whether the blades each corresponding to one of the audio segments are faulty. Under a condition that the blade is faulty, such as fracture, icing and the like, the rotation sound will change, resulting in the change of the sound intensity and frequency. Therefore, through the analysis of the audio segment, the blade can be identified whether it is faulty.

Exemplary, the step 204 of diagnosing, based on the audio segments, whether the blades each corresponding to one of the audio segments are faulty may include the following step 2041 to step 2042.

Step 2041: processing each of the audio segments by a Fourier transform to obtain a second feature value of each of the audio segments, wherein the second feature value is configured to characterize a frequency domain feature of each of the audio segments.

After performing the Fourier transform on the audio segment, the amplitude of the audio segment at each frequency may be obtained, namely the second feature value, which can represent the frequency domain feature of the audio segment. Herein, the amplitude of each frequency represents the signal power of the audio segment at the corresponding frequency.

Step 2042: inputting the second feature value of each of the audio segments to a blade fault diagnosis model to obtain a first fault diagnosis result of each of the blades.

The blade fault diagnosis model is a pre-trained model configured to identify whether a blade corresponding to the audio segment is faulty according to the second feature value of the audio segment. Exemplary, the blade fault diagnosis model may also be a machine learning based algorithm model, such as a model based on support vector machine (SVM), or a k nearest neighbor algorithm.

Exemplary, in addition to the above fault diagnosis performed based on the frequency domain feature of each of the audio segments, fault diagnosis can be performed based on the correlation of the durations of the audio segments of the blades. Under a condition that the blades are not faulty, the durations of the audio segments of the blades should be similar. Under a condition that there is a faulty blade, the corresponding blade rotation sound may become larger, that is, the sound intensity may become larger. Therefore, when dividing the blade rotation audio according to the sound intensity, the duration of the corresponding blade will increase, the durations of other blades will reduce, and the difference between the durations may become larger.

Based on the above principle, the step 204 may also include the following step 2043 to step 2044.

Step 2043: counting durations of the audio segments corresponding to the blades respectively.

Step 2044: obtaining a second fault diagnosis result by judging whether there is a faulty blade according to whether a difference between durations of every two audio segments exceeds a preset threshold value.

Under a condition that there is a faulty blade, the rotation sound intensity of the blade will change, and usually the rotation sound of the faulty blade may become larger. Therefore, when capturing the audio segments corresponding to the blades respectively, the duration of the audio segment of the faulty blade is relatively long, and there is an obvious difference from the durations of the audio segments of other normal blades. According to the above principle, a duration threshold value (a preset threshold value) can be preset. Under a condition that the duration difference of any two audio segments exceeds the preset threshold value, there is a faulty blade in the wind turbine generator system.

After step 2042 and step 2044 are performed, it is judged, by combining the first fault diagnosis result of each of the blades and the second fault diagnosis result, whether there is a faulty blade.

The first fault diagnosis result is a result of the fault diagnosis performed independently through the blade fault recognition model according to each of the audio segments. For each of the audio segments corresponding to the blades respectively, a corresponding first fault diagnosis result may be obtained. For example, whether a corresponding blade is faulty or not faulty may be represented through the status values 0 and 1 respectively.

The second fault diagnosis result is a result of judging whether there is a faulty blade according to whether the durations of the audio segments are consistent.

Combining the first fault diagnosis result and the second fault diagnosis result, whether there is a faulty blade can be more accurately judged.

In different seasons or weather, the blades may fail due to environmental reasons. For example, lightning is prone to in summer, and the wind speed in autumn is relatively large, which are easy to lead to the blade fault such as blade fracture. Further, the blades may be covered with ice in winter, and so on.

Therefore, different blade fault diagnosis models can be trained according to different fault types, and then the applied blade fault diagnosis model can be selected according to different environments, so as to perform fault diagnosis on the collected blade rotation audio. Specifically, in an exemplary embodiment, before diagnosing, based on the audio segments, whether the blades each corresponding to one of the audio segments are faulty, an environmental parameter of the wind turbine generator system is acquired, wherein the environmental parameter is configured to indicate a season and/or weather. Further, among a plurality of candidate fault diagnosis models configured to identify different fault types respectively, a model configured to identify a fault type corresponding to the environmental parameter is selected, so as to determine a fault diagnosis model for use. That is, each environmental parameter corresponds to one fault type, so that the blade fault diagnosis model of the corresponding fault type is selected for fault diagnosis.

According to the blade fault diagnosis method provided by the embodiments of the present application, the wind noise filtering algorithm can be applied to the blade rotation audio to obtain the blade rotation audio filtered out of wind noise, so as to remove the interference of wind noise in the blade rotation audio, and obtain the audio with more accurate and stronger blade rotation sound. Then, the blade rotation audio filtered out of wind noise is divided to obtain the audio segments corresponding to the blades, and based on the audio segments, it is diagnosed whether the blades each corresponding to one of the audio segments are faulty. Therefore, it can be diagnosed whether a corresponding blade is faulty respectively according to the audio segments of different blades, thereby improving the accuracy of the diagnosis results.

In an exemplary embodiment, the audio collection device may acquire the blade rotation audios collected at a plurality of locations, may select a blade rotation audio with the least wind noise and the best audio quality among the blade rotation audios collected at the plurality of locations, and then may perform the following steps 203 and 204.

Accordingly, the step 201 of acquiring the blade rotation audio collected by the audio collection device during the operation of the wind turbine generator system may include acquiring blade rotation audios collected at a plurality of locations.

The step 202 of preprocessing the blade rotation audio based on the wind noise filtering algorithm to obtain the blade rotation audio filtered out of wind noise may include processing each of the blade rotation audios respectively based on the wind noise filtering algorithm to obtain a plurality of blade rotation audios filtered out of wind noise.

After the plurality of blade rotation audios filtered out of wind noise are obtained, a wind noise parameter of each of the plurality of blade rotation audios filtered out of wind noise may be respectively calculated by a wind noise recognition model. The wind noise recognition model is a pre-trained model configured to evaluate the wind noise parameter of the audio. Exemplary, the wind noise recognition model may also be a machine learning based algorithm model, such as a SVM model, or a k nearest neighbor algorithm, or a CNN algorithm, which is not limited by the embodiments of the present application. Then, according to the wind noise parameter and among the plurality of blade rotation audios filtered out of wind noise, a blade rotation audio filtered out of wind noise with a minimum wind noise is selected and divided to obtain the audio segments corresponding to the blades respectively. Therefore, the blade rotation audio filtered out of wind noise with the minimum wind noise can be selected, which can increase the usable probability of the blade rotation audio, and improve the real-time performance of the blade fault diagnosis method.

Exemplary, in an exemplary embodiment, when calculating the wind noise parameter of each of the plurality of blade rotation audios filtered out of wind noise respectively by the wind noise recognition model, each of the plurality of blade rotation audios filtered out of wind noise is processed by a Fourier transform to obtain a third feature value of each of the plurality of blade rotation audios filtered out of wind noise. Here, the third feature value is configured to characterize a frequency domain feature of a corresponding blade rotation audio filtered out of wind noise. Then, the third feature value of each of the plurality of blade rotation audios filtered out of wind noise is input to the wind noise recognition model to obtain the wind noise parameter of each of the plurality of blade rotation audios filtered out of wind noise.

Figure 4:
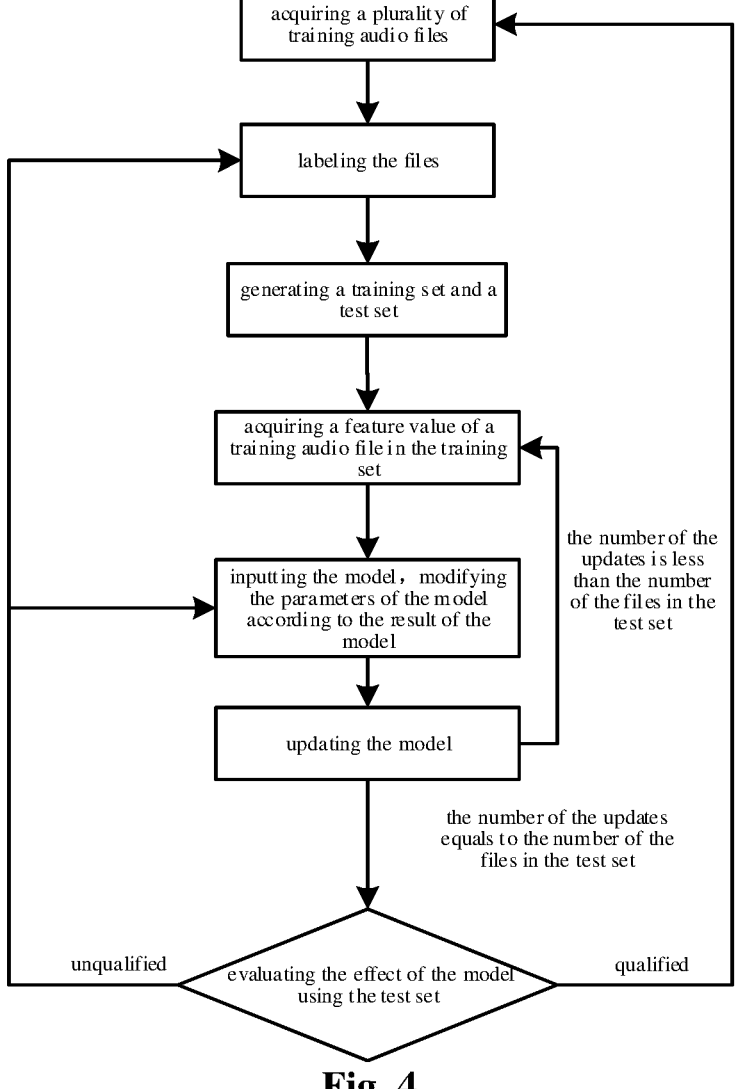
FIG. 4 is a schematic flowchart of training models in a blade fault diagnosis method provided by an embodiment of the present application.

The blade fault diagnosis model, the wind noise recognition model and the blade recognition model described in the embodiments of the present application may be trained machine learning based models, such as SVM models. An example model training method is shown in FIG. 4. The following takes training the blade recognition model as an example to illustrate the process of the training method shown in FIG. 4. It should be noted that other models described in the embodiments of the present application may also be trained based on the training method shown in FIG. 4.

Firstly, a plurality of training audio files are acquired. The training audio files are the audio files used for training the model. Then, each of the training audio files is labeled. For example, in order to train the blade recognition model, each of the training audio files is a blade rotation audio collected by a preset duration (such as 10 s). After the blade rotating audio is obtained, a waveform diagram of the sound intensity of the blade rotation audio may be illustrated. Because the blade will rotate away from the sensor, then rotate near to the sensor and then rotate away from the sensor, accordingly, the sound intensity of the blade rotation audio is from small to big, and then to small. Therefore, according to the sound intensity, the blade rotation audio may be divided. The wind turbine generator system usually has three blades, then, the blade rotation audio is divided into three audio segments, which corresponds to a rotation cycle.

For example, for the blade rotation audio 1, the labels may be 1 s, 2.1 s, 3.08 s, and 4.13 s. The audio segments obtained by dividing the blade rotation audio 1 may include an audio segment 1 within 1~2.1 s, an audio segment 2 within 2.1~3.08 s, and an audio segment 3 within 3.08~4.13 s. It should be noted that each audio segment cannot be distinguished from which actual blade it corresponds to, and the audio segments corresponding to different blades can be distinguished by different identifications. For example, the audio segment 1 corresponds to a blade 1, and the audio segment 2 corresponds to a blade 2.

After the blade rotation audios are labeled, a part of the blade rotation audios labeled with the dividing time points is used as the training set, and the other part is used as the test set. One blade rotation audio in the training set is obtained each time, the dividing time points are identified through the blade recognition model. The results obtained by the model are compared with the labels. The parameters of the model are modified according to a preset parameter modification algorithm, and the updated model is used to identify a next training audio file in the training set again.

After the model is trained with all the files in the training set, the model is used to identify the test set, and the recognition accuracy is evaluated. If the accuracy is qualified, a plurality of additional new blade rotation audios may be used to generate a training set and a test set, the model may be further corrected, and a final model may be obtained after multiple corrections. If the accuracy is unqualified, the labels on the file may be adjusted, and the current training set is continued to be used to retrain the model until the accuracy is qualified.

Figure 5:
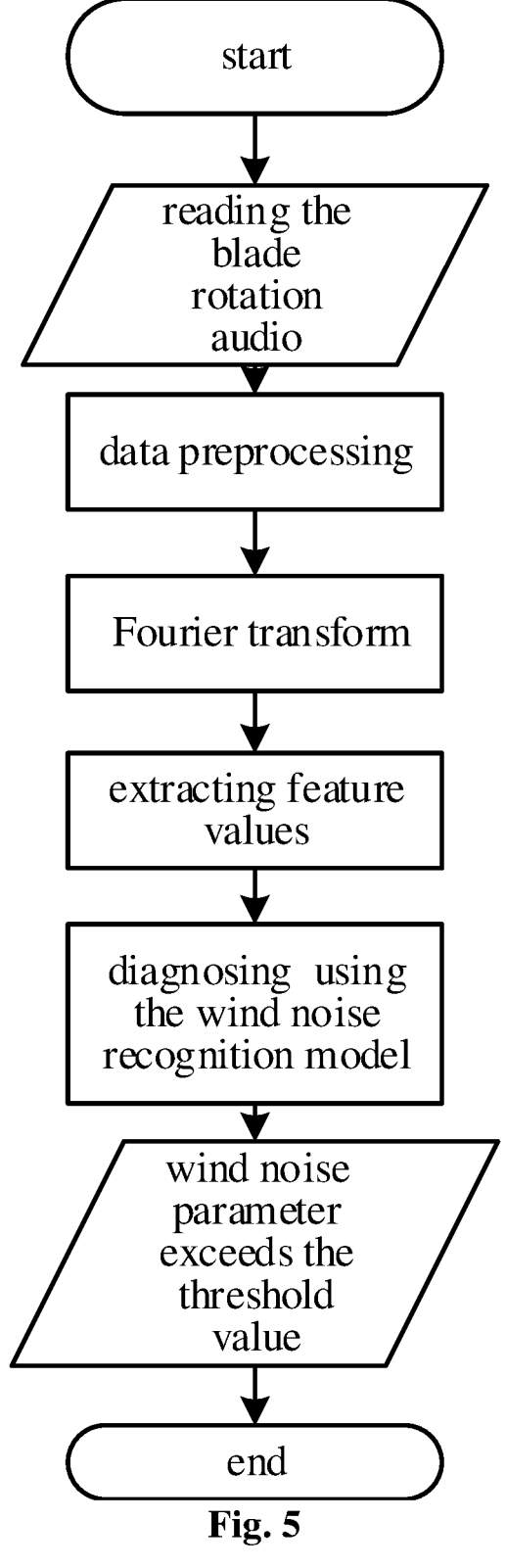
FIG. 5 is a schematic flowchart of identifying wind noise by a wind noise recognition model in a blade fault diagnosis method provided by an embodiment of the present application.

As shown in FIG. 5, FIG. 5 is a schematic flowchart of an example of identifying wind noise in a blade rotation audio by a wind noise recognition model. Firstly, a blade rotation audio is read for data preprocessing, such as preprocessing by a wind noise filtering algorithm. Then, the blade rotation audio is processed by a Fourier transform to obtain a feature value. Then, a wind noise parameter is calculated by a wind noise recognition model based on the feature value of the blade rotation audio. The greater the wind noise, the greater the wind noise parameter, and the smaller the wind noise, the smaller the wind noise parameter. Under a condition that the wind noise parameter exceeds a threshold value, the wind noise is too large, and the corresponding blade rotation audio can be abandoned for fault diagnosis. Under a condition that the wind noise parameter does not exceed the threshold value, among a plurality of blade rotation audios for which the wind noise parameters do not exceed the threshold value, a blade rotation audio with a minimum wind noise parameter can be selected as the audio for diagnosing the blade fault.

Figure 6:
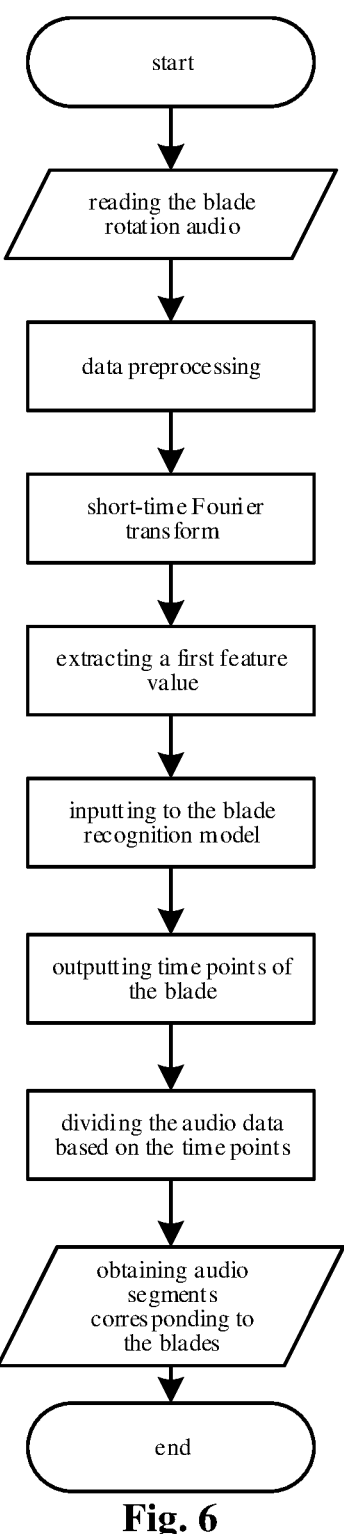
FIG. 6 is a schematic flowchart of obtaining audio segments by a blade recognition model in a blade fault diagnosis method provided by an embodiment of the present application.

As shown in FIG. 6, FIG. 6 is a schematic flowchart of an example of dividing a blade rotation audio by a blade recognition model. Firstly, a blade rotation audio is read for data preprocessing, using algorithms such as denoising. Then, the blade rotation audio is processed by a short-time Fourier transform according to a preset window length to obtain a first feature value. The first feature value may be a sequence composed of amplitudes corresponding to a plurality of frequencies. After obtaining the first feature value, the first feature value is input into the blade recognition model, and the blade recognition model will output the dividing time points of the blade. Then, the blade rotation audio may be divided based on the dividing time points, and the audio segments corresponding to the blades respectively in a rotation cycle can be captured.

Figure 7:
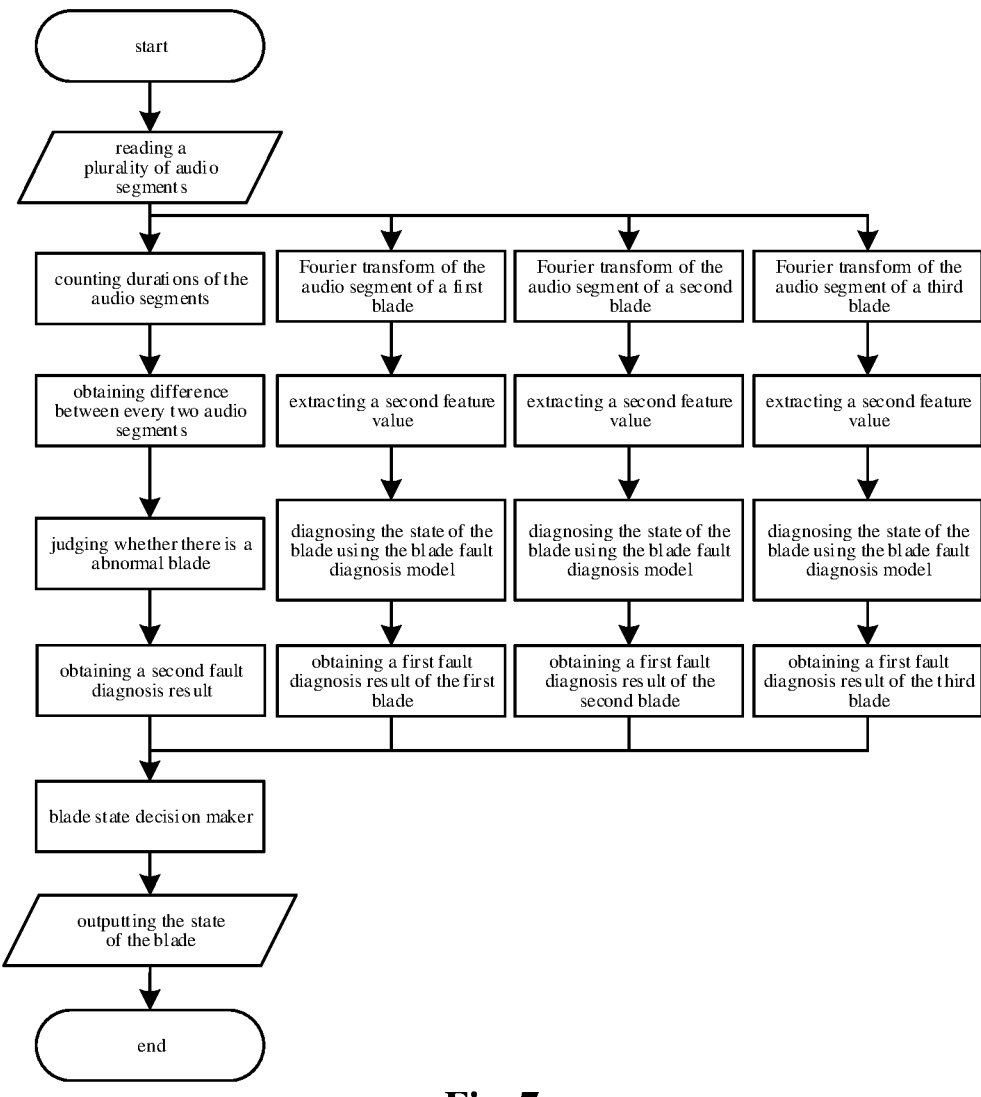
FIG. 7 is a schematic flowchart of diagnosing blade faults by a blade fault diagnosis model in a blade fault diagnosis method provided by an embodiment of the present application.

As shown in FIG. 7, FIG. 7 is a schematic flowchart of an example of diagnosing blade faults by a blade fault diagnosis model. After the divided audio segments of the three blades are obtained, the audio segments may be diagnosed respectively by the blade fault diagnosis model, and the states of the blades may be determined. Specifically, each of the audio segments may be processed by a Fourier transform respectively to obtain a second feature value of each of the audio segments. Then, the second feature value of each of the audio segments is input into a corresponding blade fault diagnosis model to obtain a fault diagnosis result of the corresponding audio segment. For example, normal may be represented by 0, and abnormal may be represented by 1. For each of the audio segments, the state of the corresponding blade may be represented by the output 0 or 1. In addition, after obtaining the divided audio segments of the blades, a second fault diagnosis result may be obtained by judging whether there is a faulty blade according to the durations of the audio segments. For example, under a condition that the difference between the duration of the audio segment 1 and the duration of the audio segment 2 is 0.1 s (which is less than the threshold value of 0.2 s), and the difference between the duration of the audio segment 1 and the duration of the audio segment 3 is 0.4 s and the difference between the duration of the audio segment 2 and the duration of the audio segment 3 is 0.3 s (which are greater than the threshold of value of 0.2 s), the states of the audio segment 1 and the audio segment 2 are consistent, and the state of the audio segment 3 is inconsistent. Furthermore, the blade state decision maker can determine the state of the blade and output it by combining the first fault diagnosis result of each of the blades and the consistency detection results of the audio durations (the second fault diagnosis results).

Figure 8:
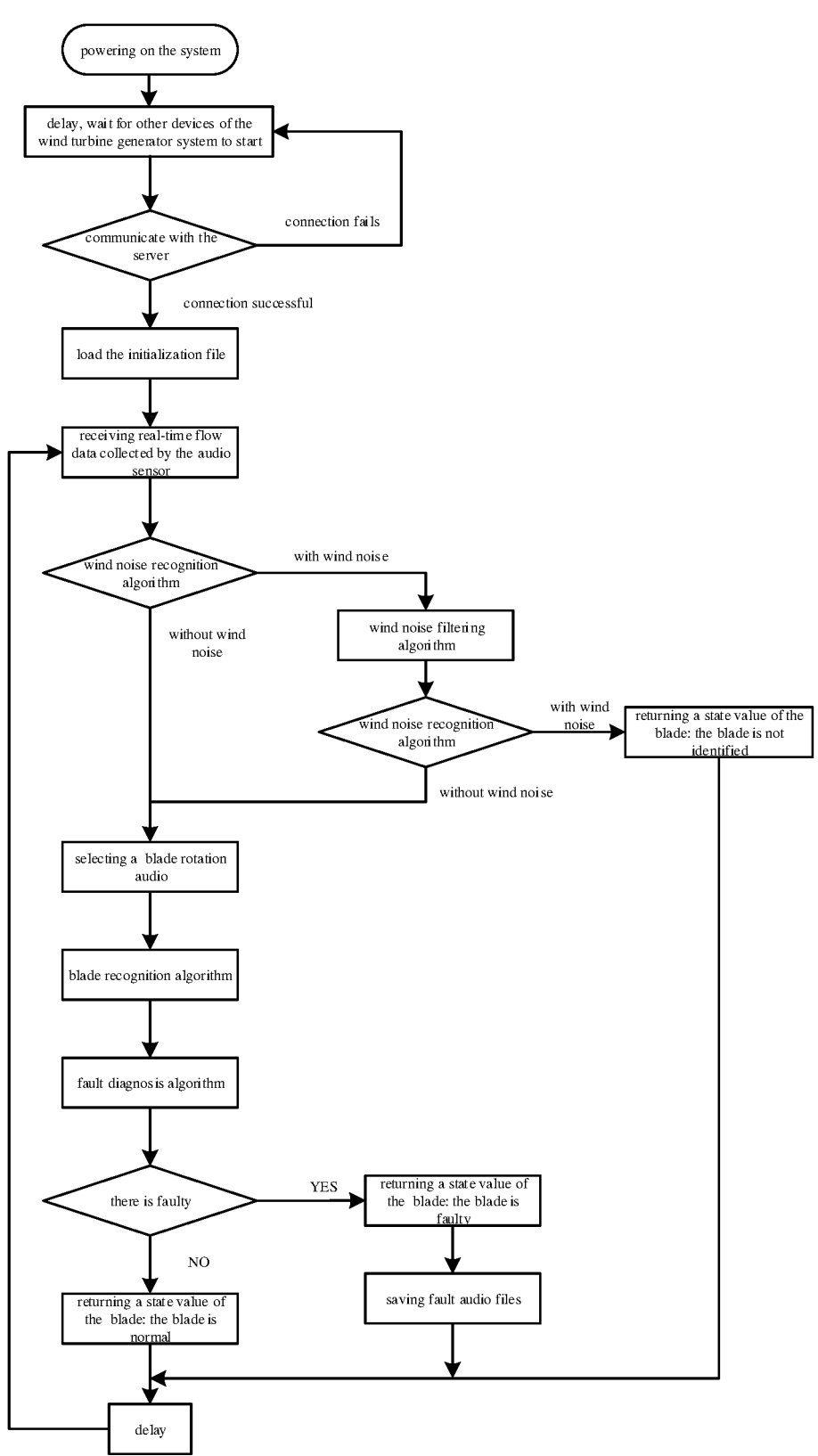
FIG. 8 is a schematic flowchart of a blade fault diagnosis method provided by another embodiment of the present application.

As a specific exemplary embodiment, a schematic flowchart of a blade fault diagnosis model provided by an embodiment of the present application is shown in FIG. 8. After the blade fault diagnosis system is powered on, the blade fault diagnosis system may wait for other devices of the wind turbine generator system to start. After a preset delay duration, the blade fault diagnosis system may communicate with the server disposed in the central control room of the wind field. Under a condition that the connection fails, the blade fault diagnosis system may wait for a further delay. Under a condition that the connection is successful, the blade fault diagnosis system may load the initialization file for initialization configuration. The initialization configuration may include configurations of the number of the audio sensors, the duration for audio data collection, and the duration for audio data storage. Then, the audio sensors may transmit the real-time acquired audio data to the blade fault diagnosis system. Then, it is determined whether there is a wind noise through the wind noise recognition model. Under a condition that there is a wind noise, it is filtered through the wind noise filtering algorithm, and then it is further determined whether there is a wind noise through the wind noise recognition model. Under a condition that there is still a wind noise, a state value of the fault diagnosis result is returned, that is, the blade is not identified. Under a condition that no wind noise is identified by the wind noise recognition model, according to the wind noise parameter obtained by the wind noise recognition model and among a plurality of blade rotation audios, a blade rotation audio with a minimum wind noise can be selected.

Then, the selected blade rotation audio is divided through the blade recognition algorithm to obtain the audio segments corresponding to the blades respectively. Then, whether there is a faulty blade can be diagnosed by the fault diagnosis algorithm as shown in FIG. 7. Under a condition that there is a faulty blade, a state value of the fault diagnosis result may be returned, that is, there is a faulty blade, and the blade rotation audio file of the faulty blade can be saved for record. Under a condition that there is no faulty blade, a state value can be returned, that is, the blades are normal. Next, after a delay duration, the real-time flow data collected by the audio sensor can be obtained again, and then the fault diagnosis can be performed to realize the effect of real-time monitoring of the blades.

Figures 9, 10:
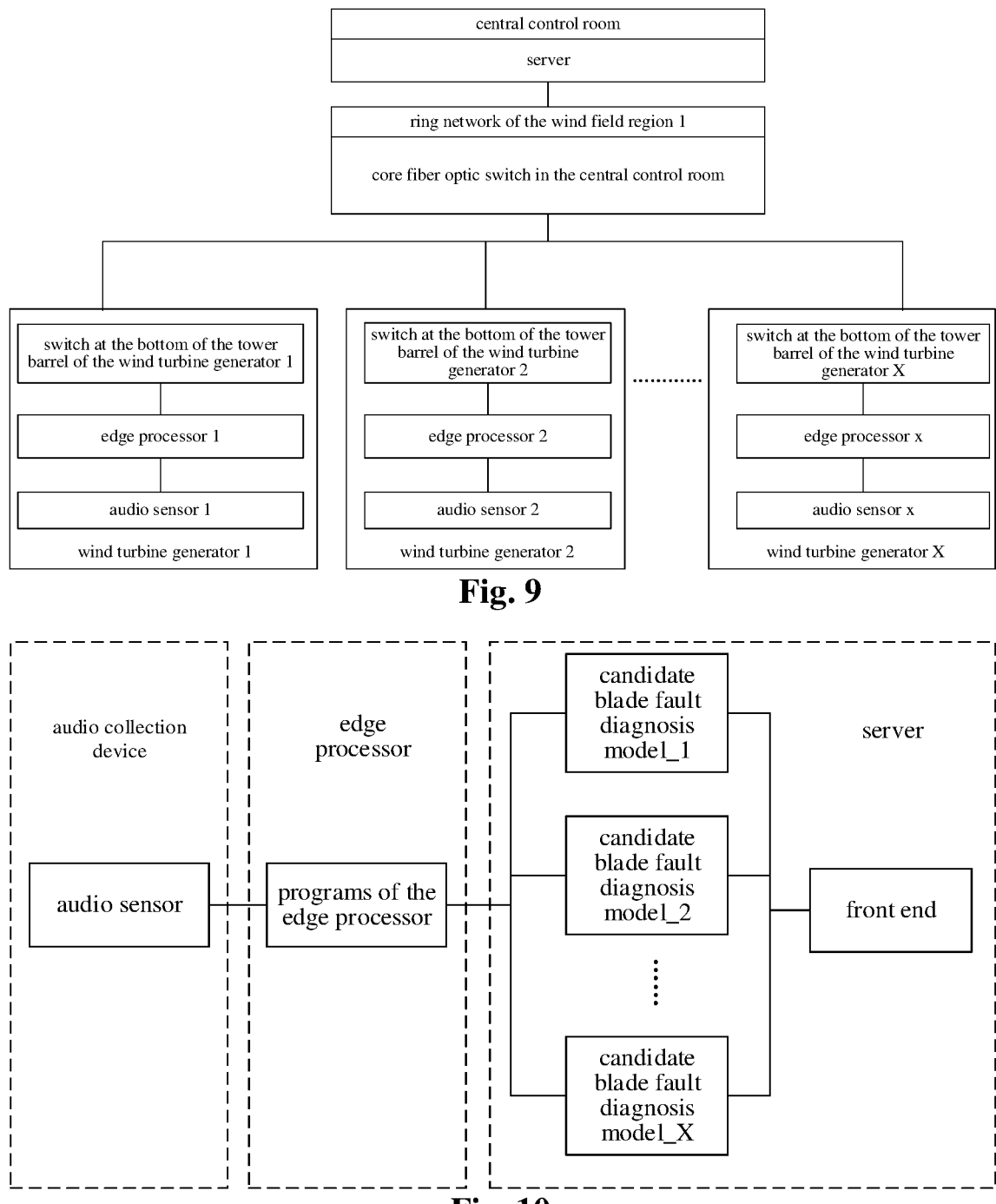
FIG. 9 is a schematic diagram of a blade fault diagnosis system provided by another embodiment of the present application.
FIG. 10 is a schematic diagram of a blade fault diagnosis system provided by another embodiment of the present application.

The present application also provides an embodiment of another blade fault diagnosis system, as shown in FIG. 9, in a wind field (wind field 1), there are a plurality of wind turbine generators. Each of the wind turbine generators is provided with an audio sensor, and the audio sensor is configured to collect the sound signal of the blades of the wind turbine generator when rotating, and transmit the sound signal to an edge processor. Here, the edge processor may be disposed inside of the tower barrel of the wind turbine generator. The edge processor may process the sound signal collected by the audio sensor into audio to obtain the blade rotation audio, and may obtain the diagnosis result through the blade fault diagnosis method provided in any embodiment of FIGS. 3 to 8. Furthermore, the blade fault diagnosis result may be transmitted to the core fiber optic switch in the central control room in the ring network of the wind field region 1 though the switch at the bottom of the tower barrel of the wind turbine generator and though cables, and then transmitted to the server in the central control room. The server can display the display interface of the WEB front end, display the blade fault diagnosis situation through the interface program, and transmit an alarm prompt when there is faulty blade. Another schematic diagram of a blade fault diagnosis system provided by the embodiment of the present application is shown in FIG. 10. The server may be configured with a plurality of candidate fault diagnosis models, may select a corresponding blade fault diagnosis model based on the environmental parameter selected by the user at the front end, and may inform the edge processor. After receiving the blade fault diagnosis model selected by the server, the programs of the edge processor may be configured to perform fault diagnosis according to the blade fault diagnosis model selected by the server.

Exemplary, the edge processor of each of the wind turbine generators may include an audio processing unit that can be configured to collect real-time audio flow data, perform fault diagnosis, save fault data (which can include fault diagnosis results and fault audio), and communicate with the server. Here, when performing fault diagnosis, data can be cached. Under a condition that there is a faulty blade, the fault data may be saved. After obtaining the fault diagnosis results, the data stored in the cache may be uploaded to the server host computer. In addition, the edge processor may also be controlled by the server host computer. For example, the edge processor may be initialized according to the server to configure the number of the audio sensors, the data storage duration, the data maximum cache space and the like. Exemplary, the edge processor may also receive the selection of the blade fault diagnosis model by the server according to the environmental parameter.

The algorithm programs of the server in the central control room can be provided with functions such as connection state verification of the wind turbine generator system, blade state communication of the wind turbine generator system, control configuration file distribution, fault data reception and the like. The WEB front end interface of the server in the central control room can be provided with functions such as connection state display of the wind turbine generator system, blade state display of the wind turbine generator system, fault data playback of the wind turbine generator system and the like.

According to the blade fault diagnosis method, apparatus and system, and the storage medium provided by the embodiments of the present application, the state of the blades of the wind turbine generator system may be monitored by real-time data processing of the audio. Compared to the video monitoring method, the advantages are that it is not affected by light; it can also monitor in real-time at night; it is not affected by fog weather; and it can effectively monitor the state of the blades for a long time. Therefore, abnormal sound problem of the blade caused by the blade's own leading edge corrosion, lightning strike, fracture, crack and other reasons may be identified in the first time, and then timely maintenance may be performed, which can avoid the blade major failure loss caused by the blade cumulative failure.

An embodiment of the present application further provides a blade fault diagnosis apparatus, which can be used to perform the blade fault diagnosis method provided by the embodiment of the present application. The part not detailed described in the blade fault diagnosis apparatus provided by the embodiment of the present application can refer to the description of the blade fault diagnosis method provided by the embodiment of the present application, and will not be repeated here.

Figure 11:
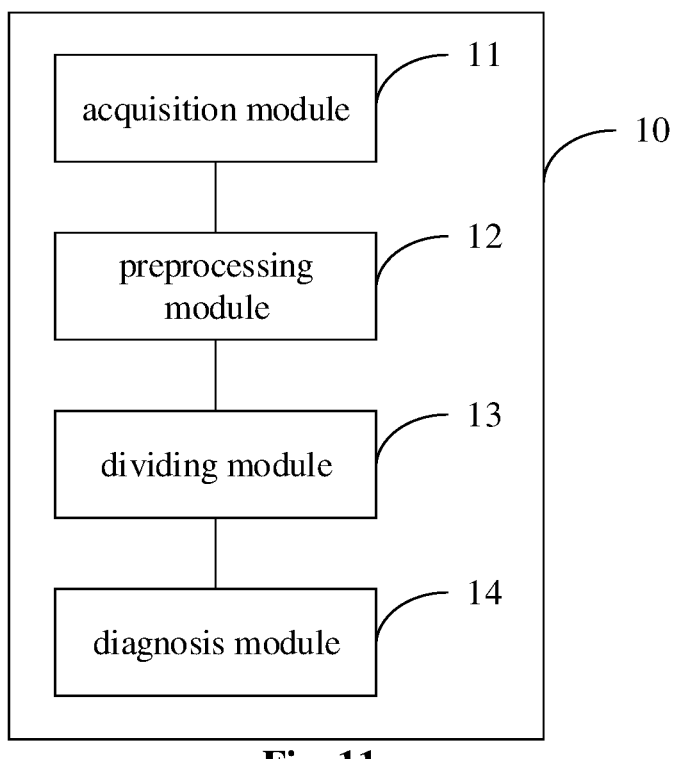
FIG. 11 is a schematic diagram of a blade fault diagnosis apparatus provided by an embodiment of the present application.

As shown in FIG. 11, the blade fault diagnosis apparatus 10 provided by the embodiment of the present application includes an acquisition module 11, a preprocessing module 12, a dividing module 13, and a diagnosis module 14.

The acquisition module 11 is configured to acquire a blade rotation audio collected by an audio collection device during an operation of a wind turbine generator system. The pre-processing module 12 is configured to preprocess the blade rotation audio based on a wind noise filtering algorithm to obtain a blade rotation audio filtered out of wind noise. The dividing module 13 is configured to divide the blade rotation audio filtered out of wind noise to obtain audio segments corresponding to blades of the wind turbine generator system respectively. The diagnosis module 14 is configured to diagnose, based on the audio segments, whether the blades each corresponding to one of the audio segments are faulty.

Exemplary, the dividing module 13 is further configured to: process, by a short-time Fourier transform, the blade rotation audio filtered out of wind noise to obtain a first feature value, wherein the first feature value is configured to characterize a frequency domain feature of the blade rotation audio filtered out of wind noise; input the first feature value to a blade recognition model to obtain dividing time points of the blade rotation audio filtered out of wind noise, wherein the blade recognition model is a pre-trained model configured to identify switching time points of rotation sounds of different blades according to the first feature value; divide the blade rotation audio filtered out of wind noise according to the dividing time points to obtain the audio segments corresponding to the blades respectively.

Exemplary, the diagnosis module 14 is further configured to: process each of the audio segments by a Fourier transform to obtain a second feature value of each of the audio segments, wherein the second feature value is configured to characterize a frequency domain feature of each of the audio segments; input the second feature value of each of the audio segments to a blade fault diagnosis model to obtain a first fault diagnosis result of each of the blades, wherein the blade fault diagnosis model is a pre-trained model configured to identify whether a blade corresponding to the audio segment is faulty according to the second feature value of the audio segment.

Exemplary, the diagnosis module 14 is further configured to: count durations of the audio segments corresponding to the blades respectively; obtain a second fault diagnosis result by judging whether there is a faulty blade according to whether a difference between durations of every two audio segments exceeds a preset threshold value; judge, by combining the first fault diagnosis result of each of the blades and the second fault diagnosis result, whether there is a faulty blade.

Exemplary, the blade fault diagnosis apparatus 10 further includes:

an acquisition unit configured to acquire, before diagnosing, based on the audio segments, whether the blades each corresponding to one of the audio segments are faulty, an environmental parameter of the wind turbine generator system, wherein the environmental parameter is configured to indicate a season and/or weather; a determination unit configured to determine, among a plurality of candidate fault diagnosis models configured to identify different fault types respectively, a model configured to identify a fault type corresponding to the environmental parameter, so as to determine a fault diagnosis model for use.

Exemplary, the acquisition module 11 is further configured to acquire blade rotation audios collected at a plurality of locations. The blade fault diagnosis apparatus 10 is further configured to process each of the blade rotation audios respectively based on the wind noise filtering algorithm to obtain a plurality of blade rotation audios filtered out of wind noise. The apparatus further includes a calculation unit configured to calculate, after the plurality of blade rotation audios filtered out of wind noise are obtained, a wind noise parameter of each of the plurality of blade rotation audios filtered out of wind noise respectively by a wind noise recognition model, wherein the wind noise parameter is configured to represent a wind noise level in the audio, and the wind noise recognition model is a pre-trained model configured to evaluate the wind noise parameter of the audio. The dividing module 13 is further configured to select, according to the wind noise parameter and among the plurality of blade rotation audios filtered out of wind noise, a blade rotation audio filtered out of wind noise with a minimum wind noise, and divide the blade rotation audio filtered out of wind noise with the minimum wind noise to obtain the audio segments corresponding to the blades respectively.

Exemplary, the calculation unit is further configured to: process each of the plurality of blade rotation audios filtered out of wind noise by a Fourier transform to obtain a third feature value of each of the plurality of blade rotation audios filtered out of wind noise, and the third feature value is configured to characterize a frequency domain feature of a corresponding blade rotation audio filtered out of wind noise; input the third feature value of each of the plurality of blade rotation audios filtered out of wind noise to the wind noise recognition model to obtain the wind noise parameter of each of the plurality of blade rotation audios filtered out of wind noise.

According to the blade fault diagnosis apparatus provided by the embodiments of the present application, the wind noise filtering algorithm can be applied to the blade rotation audio to obtain the blade rotation audio filtered out of wind noise, so as to remove the interference of wind noise in the blade rotation audio, and obtain the audio with more accurate and stronger blade rotation sound. Then, the blade rotation audio filtered out of wind noise is divided to obtain the audio segments corresponding to the blades, and based on the audio segments, it is diagnosed whether the blades each corresponding to one of the audio segments are faulty. Therefore, it can be diagnosed whether a corresponding blade is faulty respectively according to the audio segments of different blades, thereby improving the accuracy of the diagnosis results.

An embodiment of the present application provides a storage medium having computer program instructions stored thereon, wherein the computer program instructions, when executed by a processor, implement the blade fault diagnosis method provided by the embodiment of the present application.

It should be clear that the present application is not limited to the specific configuration and processing described above and illustrated in figures. For the sake of simplicity, a detailed description of the known methods is omitted here. In the above embodiments, several specific steps are described and illustrated as examples. However, the method process of the present application is not limited to the specific steps described and shown, and after understanding the spirit of the present application, those skilled in the art can may make changes, modifications and additions, or may change the order of the steps.

The functional blocks shown in the structural views described above may be implemented as hardware, software, firmware, or a combination thereof. When implemented as hardware, it may be, for example, an electronic circuit, an application specific integrated circuit (ASIC), appropriate firmware, plugins, function cards, etc. When implemented as software, elements of the present application are programs or code segments for performing required tasks. The programs or code segments may be stored in a machine-readable medium, or transmitted on a transmission medium or a communication link through a data signal carried in a carrier wave. The "machine-readable medium" may include any medium that can store or transmit information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segments may be downloaded via a computer network such as the Internet, intranet, and so on.

It should also be noted that according to the exemplary embodiments described in the present application, some methods or systems are described based on a series of steps or apparatuses. However, the present application is not limited to the above order of the steps. That is, the steps may be executed in the order described in the embodiments or in orders different from that in the embodiments, or several steps may be executed simultaneously.

Aspects of the present application are described above with reference to flowcharts and/or block diagrams of methods, devices (systems) and machine program products according to embodiments of the present application. It will be understood that each block of the flowcharts and/or block diagrams, and combinations of blocks of the flowcharts and/or block diagrams, can be implemented by computer program instructions. These computer program instructions may be provided to a processor of a general purpose computer, a special purpose computer, or other programmable data processing device to produce a machine, such that these instructions executed by the processor of the computer or other programmable data processing device enable implementation of the functions/acts specified in one or more blocks of the flowcharts and/or block diagrams. Such a processor may be, but not limited to, a general purpose processor, a special purpose processor, an application specific processor, or a field programmable logic circuit. It will also be understood that each block of the block diagrams and/or flowcharts, and combinations of blocks of the block diagrams and/or flowcharts, can also be implemented by special purpose hardware for performing specified functions or actions, or can be implemented by a combination of special purpose hardware and computer instructions.

The above are only specific implementations of the present application, those skilled in the art can clearly understand that, for the convenience and brevity of the description, the specific working processes of the above-described systems, modules and units can be referred to the corresponding processes in the foregoing method embodiments, which is not repeated here. It should be understood that, the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A blade fault diagnosis method, comprising:

acquiring a blade rotation audio collected by an audio collection device during operation of a wind turbine generator system;

preprocessing the blade rotation audio based on a wind noise filtering algorithm to obtain a blade rotation audio filtered out of wind noise;

dividing the blade rotation audio filtered out of wind noise to obtain audio segments corresponding to blades of the wind turbine generator system respectively;

diagnosing, based on the audio segments, whether the blades each corresponding to one of the audio segments are faulty, transmitting blade fault diagnosis result to a server in a central control room; and causing the server to display the blade fault diagnosis result through an interface program, and to transmit an alarm prompt when there is faulty blade, wherein diagnosing, based on the audio segments, whether the blades each corresponding to one of the audio segments are faulty comprises:

processing each of the audio segments by a Fourier transform to obtain a second feature value of each of the audio segments, wherein the second feature value is configured to characterize a frequency domain feature of each of the audio segments;

inputting the second feature value of each of the audio segments to a blade fault diagnosis model to obtain a first fault diagnosis result of each of the blades, wherein the blade fault diagnosis model is a pre-trained model configured to identify whether a blade corresponding to the audio segment is faulty according to the second feature value of the audio segment;

counting durations of the audio segments corresponding to the blades respectively;

obtaining a second fault diagnosis result by judging whether there is a faulty blade according to whether a difference between durations of every two audio segments exceeds a preset threshold value; and judging, by combining the first fault diagnosis result of each of the blades and the second fault diagnosis result, whether there is a faulty blade.

2. The blade fault diagnosis method according to claim 1, wherein dividing the blade rotation audio filtered out of wind noise to obtain the audio segments corresponding to the blades respectively comprises:

processing, by a short-time Fourier transform, the blade rotation audio filtered out of wind noise to obtain a first feature value, wherein the first feature value is configured to characterize a frequency domain feature of the blade rotation audio filtered out of wind noise;

inputting the first feature value to a blade recognition model to obtain dividing time points of the blade rotation audio filtered out of wind noise, wherein the blade recognition model is a pre-trained model configured to identify switching time points of rotation sounds of different blades according to the first feature value;

dividing the blade rotation audio filtered out of wind noise according to the dividing time points to obtain the audio segments corresponding to the blades respectively.

3. The blade fault diagnosis method according to claim 1, wherein before diagnosing, based on the audio segments, whether the blades each corresponding to one of the audio segments are faulty, the method further comprises:

acquiring an environmental parameter of the wind turbine generator system, wherein the environmental parameter is configured to indicate a season and/or weather;

determining, among a plurality of candidate fault diagnosis models configured to identify different fault types respectively, a model configured to identify a fault type corresponding to the environmental parameter, so as to determine a fault diagnosis model for use.

4. The blade fault diagnosis method according to claim 1, wherein acquiring the blade rotation audio collected by the audio collection device during the operation of the wind turbine generator system comprises acquiring blade rotation audios collected at a plurality of locations;

preprocessing the blade rotation audio based on the wind noise filtering algorithm to obtain the blade rotation audio filtered out of wind noise comprises processing each of the blade rotation audios respectively based on the wind noise filtering algorithm to obtain a plurality of blade rotation audios filtered out of wind noise;

after the plurality of blade rotation audios filtered out of wind noise are obtained, the method further comprises calculating a wind noise parameter of each of the plurality of blade rotation audios filtered out of wind noise respectively by a wind noise recognition model, wherein the wind noise parameter is configured to represent a wind noise level in the audio, and the wind noise recognition model is a pre-trained model configured to evaluate the wind noise parameter of the audio;

dividing the blade rotation audio filtered out of wind noise to obtain the audio segments corresponding to the blades respectively comprises selecting, according to the wind noise parameter and among the plurality of blade rotation audios filtered out of wind noise, a blade rotation audio filtered out of wind noise with a minimum wind noise, and dividing the blade rotation audio filtered out of wind noise with the minimum wind noise to obtain the audio segments corresponding to the blades respectively.

5. The blade fault diagnosis method according to claim 4, wherein calculating the wind noise parameter of each of the plurality of blade rotation audios filtered out of wind noise respectively by the wind noise recognition model comprises:

processing each of the plurality of blade rotation audios filtered out of wind noise by a Fourier transform to obtain a third feature value of each of the plurality of blade rotation audios filtered out of wind noise, and the third feature value is configured to characterize a frequency domain feature of a corresponding blade rotation audio filtered out of wind noise;

inputting the third feature value of each of the plurality of blade rotation audios filtered out of wind noise to the wind noise recognition model to obtain the wind noise parameter of each of the plurality of blade rotation audios filtered out of wind noise.

6. A blade fault diagnosis apparatus, comprising:

an acquisition module configured to acquire a blade rotation audio collected by an audio collection device during an operation of a wind turbine generator system;

a preprocessing module configured to preprocess the blade rotation audio based on a wind noise filtering algorithm to obtain a blade rotation audio filtered out of wind noise;

a dividing module configured to divide the blade rotation audio filtered out of wind noise to obtain audio segments corresponding to blades of the wind turbine generator system respectively;

a diagnosis module configured to diagnose, based on the audio segments, whether the blades each corresponding to one of the audio segments are faulty, an alarm module configured to transmitting blade fault diagnosis result to a server in a central control room, and causing the server to display the blade fault diagnosis result through an interface program, and to transmit an alarm prompt when there is faulty blade, wherein the diagnosis module is further configured to:

process each of the audio segments by a Fourier transform to obtain a second feature value of each of the audio segments, wherein the second feature value is configured to characterize a frequency domain feature of each of the audio segments:

input the second feature value of each of the audio segments to a blade fault diagnosis model to obtain a first fault diagnosis result of each of the blades, wherein the blade fault diagnosis model is a pre-trained model configured to identify whether a blade corresponding to the audio segment is faulty according to the second feature value of the audio segment:

count durations of the audio segments corresponding to the blades respectively;

obtain a second fault diagnosis result by judging whether there is a faulty blade according to whether a difference between durations of every two audio segments exceeds a reset-threshold value; and judge, by combining the first fault diagnosis result of each of the blades and the second fault diagnosis result, whether there is a faulty blade.

7. A blade fault diagnosis system, comprising:

an audio collection device comprising a plurality of audio sensors, wherein at least one of the audio sensors is disposed at a prevailing wind direction position or a lee wind direction position of a tower barrel of a wind turbine generator system;

a processor disposed inside of the tower barrel and connected to the audio sensors, wherein the processor is configured to: receive a blade rotation audio collected by the audio sensors; preprocess the blade rotation audio based on a wind noise filtering algorithm to obtain a blade rotation audio filtered out of wind noise; divide the blade rotation audio filtered out of wind noise to obtain audio segments corresponding to blades of the wind turbine generator system respectively; diagnose, based on the audio segments, whether the blades each corresponding to one of the audio segments are faulty; transmit blade fault diagnosis result to a server in a central control room; and cause the server to display the blade fault diagnosis result through an interface program, and to transmit an alarm prompt when there is faulty blade, wherein the processor is further configured to:

process each of the audio segments by a Fourier transform to obtain a second feature value of each of the audio segments, wherein the second feature value is configured to characterize a frequency domain feature of each of the audio segments:

input the second feature value of each of the audio segments to a blade fault diagnosis model to obtain a first fault diagnosis result of each of the blades wherein the blade fault diagnosis model is a pre-trained model configure to identify whether a blade corresponding to the audio segment is faulty according to the second feature value of the audio segment;

count durations of the audio segments corresponding to the blades respectively;

obtain a second fault diagnosis result by judging whether there is a faulty blade according to whether a difference between durations of every two audio segments exceeds a preset threshold value; and judge, by combining the first fault diagnosis result of each of the blades and the second fault diagnosis result, whether there is a faulty blade.

8. A storage medium having computer program instructions stored thereon, wherein the computer program instructions, when executed by a processor, implement a blade fault diagnosis method, comprising:

acquiring a blade rotation audio collected by an audio collection device during operation of a wind turbine generator system:

preprocessing the blade rotation audio based on a wind noise filtering algorithm to obtain a blade rotation audio filtered out of wind noise:

dividing the blade rotation audio filtered out of wind noise to obtain audio segments corresponding to blades of the wind turbine generator system respectively;

diagnosing, based on the audio segments, whether the blades each corresponding to one of the audio segments are faulty, transmitting blade fault diagnosis result to a server in a central control room; and causing the server to display the blade fault diagnosis result through an interface program, and to transmit an alarm prompt when there is faulty blade, wherein diagnosing, based on the audio segments, whether the blades each corresponding to one of the audio segments are faulty comprises:

processing each of the audio segments by a Fourier transform to obtain a second feature value of each of the audio segments, wherein the second feature value is configured to characterize a frequency domain feature of each of the audio segments;

inputting the second feature value of each of the audio segments to a blade fault diagnosis model to obtain a first fault diagnosis result of each of the blades wherein the blade fault diagnosis model is a pre-trained model configured to identify whether a blade corresponding to the audio segment is faulty according to the second feature value of the audio segment;

counting durations of the audio segments corresponding to the blades respectively;

obtaining a second fault diagnosis result by judging whether there is a faulty blade according to whether a difference between duration of every two audio segments exceeds a preset threshold value; and judging, by combining the first fault diagnosis result of each of the blades and the second fault diagnosis result, whether there is a faulty blade.

* * * * *